United States Patent [19]

Sutton et al.

[11] 4,219,361
[45] Aug. 26, 1980

[54] METHOD OF IMPROVING THE SUSCEPTIBILITY OF A MATERIAL TO MICROWAVE ENERGY HEATING

[75] Inventors: Willard H. Sutton; Walter E. Johnson, both of Clinton, N.Y.

[73] Assignee: Special Metals Corporation, New Hartford, N.Y.

[21] Appl. No.: 914,120

[22] Filed: Jun. 9, 1978

Related U.S. Application Data

[63] Continuation-in-part of Ser. No. 795,345, May 9, 1977, abandoned.

[51] Int. Cl.² .................... C04B 35/02; C04B 35/64
[52] U.S. Cl. ........................................ 106/63; 106/65; 106/66; 106/73.4; 219/10.41; 219/10.43; 252/1; 252/62; 264/25
[58] Field of Search ............ 219/10.41, 10.43; 264/25, 26; 423/115; 106/65, 66, 73.4

[56] References Cited

U.S. PATENT DOCUMENTS

| | | | |
|---|---|---|---|
| 2,452,041 | 10/1948 | Elmore | 423/115 |
| 2,903,338 | 9/1959 | Porter | 423/115 |
| 3,551,172 | 12/1970 | Guile | 106/60 |
| 3,585,258 | 6/1971 | Levinson | 264/25 X |
| 4,003,840 | 1/1977 | Ishino et al. | 252/62 |
| 4,025,351 | 5/1977 | Masaki | 106/59 |
| 4,115,133 | 9/1978 | Kunkele et al. | 106/59 |

Primary Examiner—Leland A. Sebastian
Attorney, Agent, or Firm—Vincent G. Gioia; William J. O'Rourke, Jr.

[57] ABSTRACT

The susceptibility of a material to heating by exposure to microwave energy which material has slight or no such susceptibility is improved by mixing it in granular form with a microave reactive agent also in granular form which is capable of substantially responding to microwave energy. An article made from this mixture can be directly heated with microwave energy.

7 Claims, No Drawings

METHOD OF IMPROVING THE SUSCEPTIBILITY OF A MATERIAL TO MICROWAVE ENERGY HEATING

This application which is a continuation-in-part of our co-pending Application Ser. No. 795,345 filed May 9, 1977, now abandoned, relates to a method of improving the susceptibility of a material to microwave energy reaction and more particularly to making an article including said material which can be heated directly by microwave energy.

Microwaves are electromagnetic waves which transmit energy through space. The frequency spectrum which can be used for the microwave heating of an object is higher than radio waves and much lower in frequency than infrared or visible light. For example, for industrial and home microwave ovens, the F.C.C. allows four frequencies, the most common being 2450 MHz (2450 million cycles per second) because it generally permits the use of system components of reasonable size. The United States Government also permits use of 915 MHz. The effect of these microwaves on various materials vary. Materials can be classified into three general classes with respect to behavior when exposed to microwave energy. These are (1) reflective, (2) transparent and (3) absorbant. Metals and some other materials which fall into the first class act somewhat as a mirror and reflect the microwaves. Materials which act somewhat as glass and are transparent to the microwaves (microwave energy) so that they can pass therethrough fall in the second class. Still other materials which are absorbant to the microwave fall in the third class. Few materials are completely transparent or absorbant so that in most cases materials of the second class will absorb some microwave energy and materials of the third class will not absorb all the microwave energy. However, it is generally considered that materials which can be heated a substantial amount by microwaves fall into the third class. The heating rate is influenced by mass, weight, shape and composition.

For various reasons it may be desirous to heat materials of the first two classes set forth above by microwaves, but to the best of our knowledge this has not been possible up to the time of our invention. For example, articles made of such materials cannot be directly heated with microwave energy and yet in many cases such heating, if possible, would be better and/or cheaper than the methods presently used.

DESCRIPTION OF THE PRIOR ART

U.S. Pat. No. 2,783,348 to Warren relates to high frequency heating and more particularly to the rapid dielectric heating of large areas. The patent shows an enclosure to minimize or to eliminate radiation, and suggests the use of dielectric heating for large area loads, such as: foam rubber mattresses, wall board panels, groups of sand cores or plastic preforms.

U.S. Pat. No. 2,798,832 to Harvey suggests a method of agitating the quenching medium with the aid of sonic waves to produce a completely martensitic structure. The use of high frequencies such as sonic waves is suggested to remove the undesirable effects of the insulating vapor layer. The film is instantaneously removed with a marked increase in quenching effectiveness. The frequency used is 25,000 cycles per second, but frequencies up to 5 megacycles per second or 5 megahertz are also used. This patent is concerned with a method of hardening ferrous metals and increasing the H value.

U.S. Pat. No. 3,323,340 to Bitzer discloses a method and apparatus for simultaneously cold forming and stress relieving metal coils. The patent is concerned with the normalizing of coil springs. Internal stresses in metal parts are eliminated by subjecting them to ultrasonic vibrations at a temperature of 22 100 kilocycles.

U.S. Pat. No. 3,984,892 to Conta relates to the process for heat treating and sintering powder metal compacts to prepare the compacts for final forming operations. Use is made of radio frequency preheating with 50 KHz for a sufficient length of time to substantially reduce the electrical resistivity of the powder metal compact. This patent proposes a pretreatment of powder metal compact with a radio frequency in the range of 50 KHz for a sufficient period of time to substantially reduce the electrical resistivity of the powder metal compact so that it will respond more readily to low frequency induction heating and thereby reduce the time of heating in the low frequency induction field.

U.S. Pat. No. 3,585,258 relates to a process of indirectly heating an article made of a material having little or no susceptibility to microwave energy in one of three ways. In case of a hollow article the reactive reagent may be placed in the article. In the case of a solid article it may be surrounded by the reactive reagent. Also, any article may be placed in proximity to the reactive reagent. In all cases only the reactive reagent is directly heated and its heat is then transferred to the article by conduction, etc. This results in uneven heating of the article which can cause breakage. If the article does not break considerable soaking time is required to heat the article uniformly throughout. In the first two cases the reactive reagent may stick to the article, thus destroying its usefulness in many instances. Also in these two cases it is necessary to prepare the formed article prior to heating by placing the reactive reagent in or around the article. After heating, the reactive reagent must be removed from the article. These steps are costly and time consuming.

SUMMARY OF THE INVENTION

We have found that materials which are not susceptible to heating by means of microwave energy can be rendered susceptible to heating by microwave energy when a reactive agent is added to such material. For purpose of identification herein, a reactive reagent will be defined as a compound which when mixed with another material not susceptible to microwave energy will render the mixture susceptible to heating by microwave energy radiation; a material which is readily heated by means of microwave energy (class 3) will be considered to be a material which "strongly couples" to microwave energy; a material which cannot be heated by microwave energy (classes 1 and 2) will be defined as a material which is "non-coupling" to microwave energy radiation; and those materials which can be heated by means of microwave energy radiation, but which do not heat too well or for which the temperature cannot be raised very much, will be designated as a "weak-coupler". These are those which fall in the gray area between classes 2 and 3. We have found that those materials which act as "strong-couplers" to microwave energization when associated with a material which is a "non-coupler" or "weak-coupler" (hereinafter referred to as non-susceptible) will render the entire mixture readily susceptible to heating by means of microwave energy.

It is therefore an object of our invention to provide a method of making a mixture including a non-susceptible material which mixture can be directly heated to high temperatures by means of microwave energy radiation.

Another object is to provide such a method wherein commercial refractory materials which are not susceptible to heating by means of microwave energy are made heatable to high refractory temperatures by means of microwave energy.

Still another object is to make a substance susceptible to microwave energy reaction by mixing together and reacting $Al_2O_3$ and $CaO$ with water.

A further object is to make an article containing a mixture of a non-susceptible material and a reactive reagent.

These and other objects will be more apparent after referring to the following specification.

DESCRIPTION OF THE PREFERRED EMBODIMENTS

According to our invention we mix a non-susceptible material in granular form with a strong coupler in granular form to obtain a mixture susceptible to microwave energy. We have found by testing in granular form that the following materials are strong couplers:

TABLE I

Cobalt Oxide—$Co_3O_4$
Chromium Nitride—$CrN$
Iron Oxide (black)—$Fe_3O_4$
Manganese Dioxide—$MnO_2$
Nickelous Oxide—$NiO$
Nickelic Oxide—$Ni_2O_3$
Calcium Aluminate—$Ca_xAl_yO_z$ It is immaterial whether the above compounds are added as such or are formed during processing. For example, $Fe_2O_3$ which is not a strong coupler may be used and converted to $Fe_3O_4$ during processing.

By tests we have also found that a substance susceptible to microwave energy reaction can be made by mixing and reacting a major proportion of $Al_2O_3$ with a minor proportion of $CaO$ and water. $Al_2O_3$ or $CaO$ separately are poor couplers. The $Al_2O_3$ and $CaO$ are mixed in granular form, water added to this dry mixture and reacted to obtain calcium aluminate. The $Al_2O_3$ is preferably at least 90% by weight of the dry mixture and the water added to the dry mixture is preferably 8 to 15% by weight of the dry mixture. Commercial dry mixtures containing approximately 95% $Al_2O_3$ have been successfully used. One such mixture is sold under the trade name of Taylors' 440 Castable Refractory. This subsequent mixture now contains a desirable quantity of calcium aluminate and coupling occurs. Even after all or part of the water is removed the mixture remains a strong coupler either as a solid body or after being broken up into powder form.

According to one species of our invention a commercial refractory material, such as MgO, which alone cannot be heated by microwave energy is associated with one or more of the above strong couplers by mixing them in granular form. The entire mixture can then be heated by microwave energy to a high temperature, such as 2500° F. Water may be added to the mixture and the mixture formed into a solid mass or article and dried prior to heating with the microwaves.

In some cases it is desirable that articles, such as vases or solid bricks, be heated directly to high temperatures by microwave energy, but the material of the article is non-susceptible. We have found that by mixing this material in granular form with a reactive reagent in granular form and forming an article therefrom the entire article can be directly heated by microwave energy. The amount of strong coupler or reactive reagent is not critical. As little as 1% by weight will enable some heating to take place. More than 90% by weight should not be used because the characteristics of the original material would be lost. However, the greater the percentage of the strong coupler the greater will be the efficiency (percent by microwave energy absorbed) of coupling. The size of the granules are not critical and may vary widely depending upon the size of the article. However, in order to obtain satisfactory heating the maximum dimension of the reactive reagent granule should not exceed approximately ⅛ in. and the maximum dimension of the non-susceptible substance should not exceed ½ in. The shape of the granules may vary and the minimum size can be as small as possible. Of course, a few granules larger than the above would have little adverse effect.

TABLE II
EXAMPLES OF COMPOSITIONS OF ARTICLES THAT WILL COUPLE (BE HEATED) DIRECTLY ON EXPOSURE TO MICROWAVE ENERGY

| Type | Non-Coupling Oxides | | | Strong Coupler | Weak Coupler | Binder Phases | |
|---|---|---|---|---|---|---|---|
| | $Al_2O_3$ | MgO | $SiO_2$ | NiO | $Cr_2O_3$ | Sodium Silicate | Phosphoric Acid |
| (1) One Non-Coupling Oxide and One Coupling Oxide | 74 | — | — | 25 | — | 1 | — |
| | 70 | — | — | 25 | — | — | 5 |
| (2) Two Coupling and Two Non-Coupling Oxides | 74 | | | 20 | 5 | 1 | — |
| | 70 | | | 20 | 5 | — | 5 |
| (3) Several Non-Coupling Oxides and One Coupling | 64 | 10 | — | 25 | — | 1 | — |
| | 54 | 10 | 10 | 25 | — | 1 | — |
| | 64 | 10 | — | 25 | — | 1 | — |
| | 50 | 10 | 10 | 25 | — | — | 5 |

TABLE II-continued
EXAMPLES OF COMPOSITIONS OF ARTICLES THAT WILL COUPLE (BE HEATED) DIRECTLY ON EXPOSURE TO MICROWAVE ENERGY

| Type | Non-Coupling Oxides | | | Strong Coupler | Weak Coupler | Binder Phases | |
|---|---|---|---|---|---|---|---|
| | $Al_2O_3$ | MgO | $SiO_2$ | NiO | $Cr_2O_3$ | Sodium Silicate | Phosphoric Acid |
| Oxide | | | | | | | |

In the above examples all percentages are by weight. In each case 1 to 12% $H_2O$ may be added to give varying degrees of flowability as desired to form the article.

Sodium silicate may be either a solution or anhydrous sodium silicate. The phosphoric acid may be either anhydrous phosphoric acid or an $Al(H_2PO_4)_3$ solution.

It is also necessary that there be a sufficient number of granules of the reactive reagent to be distributed throughout the non-susceptible substance. For this reason the number of reactive reagent modules must be between 1 to 90% of the total number of granules in the mixture. While absolute uniformity of distribution is generally not possible there should be thorough mixing. The article may be formed merely by compression or sintering of the mixture. On the other hand water or a binding agent may be used.

It will be understood that the strong coupler may be associated with the substance having little or no susceptibility to microwave energy by mixing with the substance ingredients which will react to form the strong coupler in the mixture.

While several embodiments have been described, it will be obvious to those skilled in the art that various changes and modifications may be made without departing from the spirit and scope of the invention.

We claim:

1. The method of making an article susceptible to microwave energy reaction which comprises
    mixing together a major proportion of $Al_2O_3$ in granular form with a minor proportion of CaO in granular form to form a dry mixture
    adding a minor proportion of water to said dry mixture to form a wet mixture in which the ingredients react,
    and forming said wet mixture into said article.

2. The method of making an article according to claim 1 in which said $Al_2O_3$ is at least 90% by weight, and said water is between 8 and 15% by weight of the dry mixture.

3. The method of claim 1 in which the water is subsequently removed from the mixture.

4. A method of improving the susceptibility of a substance to direct microwave energy reaction which comprises
    mixing said substance in granular form with a microwave reactive reagent in granular form which reagent is capable of substantially greater response to microwave energy than said substance, said reactive reagent being selected from the group consisting of Colbalt Oxide ($Co_3O_4$), Chromium Nitride (CrN), a mixture of a major proportion of the reaction product of $Al_2O_3$ and CaO mixed with water and dried, and mixtures thereof.

5. The method of claim 4, wherein said reactive reagent is Cobalt Oxide ($Co_3O_4$).

6. The method of claim 4, wherein said reactive reagent is Chromium Nitride (CrN).

7. The method of claim 4, wherein said reactive reagent is the reaction product of a mixture of a major proportion of $Al_2O_3$ and a minor proportion of CaO mixed with water.

* * * * *